United States Patent [19]

Nakamichi

[11] 3,800,324

[45] Mar. 26, 1974

[54] MAGNETIC RECORDING AND REPRODUCING APPARATUS

[75] Inventor: Niro Nakamichi, Kodaira, Japan

[73] Assignee: Nakamichi Research Inc., Tokyo, Japan

[22] Filed: July 13, 1972

[21] Appl. No.: 271,486

[30] Foreign Application Priority Data

July 14, 1971 Japan.......................... 46-61710[U]

[52] U.S. Cl................... 360/96, 360/105, 242/198

[51] Int. Cl.... G11b 5/00, G11b 15/32, G11b 23/04

[58] Field of Search.......... 274/4 A, 4 B, 4 C, 11 A, 274/11 B, 11 C; 242/198, 55.19 A; 179/100.2 CA, 100.2 Z

[56] References Cited

UNITED STATES PATENTS

| | | | |
|---|---|---|---|
| 3,420,965 | 1/1969 | Townsend et al. | 179/100.2 Z |
| 3,693,983 | 9/1972 | Lemelson | 274/4 C |

*Primary Examiner*—Leonard D. Christian

[57] ABSTRACT

A magnetic recording and reproducing apparatus for use with a cassette including a pair of reels between which a magnetic tape is wound, comprising a magnetic head movable between an advanced position in which the magnetic head contacts the tape in the cassette and a retracted position in which the head is apart from the cassette, a capstan for feeding the tape in the cassette and a pinch roller arranged to associate with the magnetic head for forcing the tape against the capstan, said cassette having a non-operative position in which the cassette can be received into the apparatus and withdrawn therefrom and an operative position in which the cassette cooperates with the magnetic head and the pinch roller in the advanced position and the capstan to record on or reproduce from the tape in the cassette, said apparatus including a tension device adapted to resiliently apply tension on the tape in the cassette when the cassette is in the operative position, comprising a tension arm having an engaging portion for engaging the tape in an antifrictional manner, said tension device associated with said magnetic head and said pinch roller so that when the said magnetic head and said pinch roller engage the tape, said engaging portion of said tension arm is forced against the tape and when said head and said pinch roller are disengaged with the tape, said engaging portion of said tension arm is apart from the tape.

9 Claims, 7 Drawing Figures

MAGNETIC RECORDING AND REPRODUCING APPARATUS

BACKGROUND OF THE INVENTION

In a cassette type magnetic recording and reproducing apparatus for use in connection with an electronic computer, a magnetic tape is fed at higher speed than that of a conventional household recording and reproducing apparatus of the same type and the magnetic tape is frequently switched to move and stop during the operation of the computer. Since such apparatus includes a cassette with a supply reel adapted to be free to rotate during the operation of the apparatus, a change in tension of the tape when it begins to be fed adversely affects the stability of the operation and as a result the tape tends to be broken due to the high tension applied on the tape in the cassette. Also, in such apparatus, if the magnetic tape is offset from the predetermined track position of the magnetic head or if the tape flutters during the operation of the apparatus, it undesiredly feeds out an error signal.

SUMMARY OF THE INVENTION

It is a principal object of the invention to provide a magnetic recording and reproducing apparatus for use with a cassette wherein a change in tension applied on a magnetic tape in the cassette is effectively absorbed without its transmission to a supplying reel in the cassette to effect the prevention of the tape from breaking due to the high tension abruptly applied on the tape.

It is another object of the invention to provide a magnetic recording and reproducing apparatus of the above-mentioned type wherein a magnetic tape in the cassette is guided so that the tape positively contacts a magnetic head at the predetermined track position thereof.

It is a further object of the invention to provide a magnetic recording and reproducing apparatus of the aforementioned type wherein the fluttering of the tape in the cassette is prevented to effect the reliable operation of the apparatus.

In accordance with the present invention, there is provided a magnetic recording and reproducing apparatus for use with a cassette including a pair of reels between which a magnetic tape is wound, comprising a magnetic head movable between an advanced position in which the magnetic head contacts the tape in the cassette and a retracted position in which the magnetic head is apart from the cassette, a capstan for feeding the tape in the cassette and a pinch roller arranged to associate with the magnetic head for forcing the tape against the capstan, said cassette having a non-operative position in which the cassette can be received into the apparatus and withdrawn therefrom and an operative position in which the cassette cooperates with the magnetic head and the pinch roller in the advanced position and the capstan to record on or reproduce from the tape in the cassette, said apparatus including a tension device arranged to resiliently apply tension on the magnetic tape in the cassette when the cassette is in the operative position, comprising a tension arm having an engaging portion for engaging the tape in an anti-frictional manner, said tension device associated with said magnetic head and said pinch roller so that when said head and said pinch roller engage the tape, said engaging portion of said tension arm is forced against the tape and when said head and said pinch roller are disengaged with the tape, said engaging portion of said tension arm is apart from the tape.

The above and other objects and attendant advantages of the present invention will be more apparent to those skilled in the art from a reading of the following detailed description in conjunction with the accompanying drawings in which the preferred embodiments of the magnetic recording and reproducing apparatus in accordance with the present invention are illustrated.

DETAILED DESCRIPTION OF THE EMBODIMENTS

Figure 1:
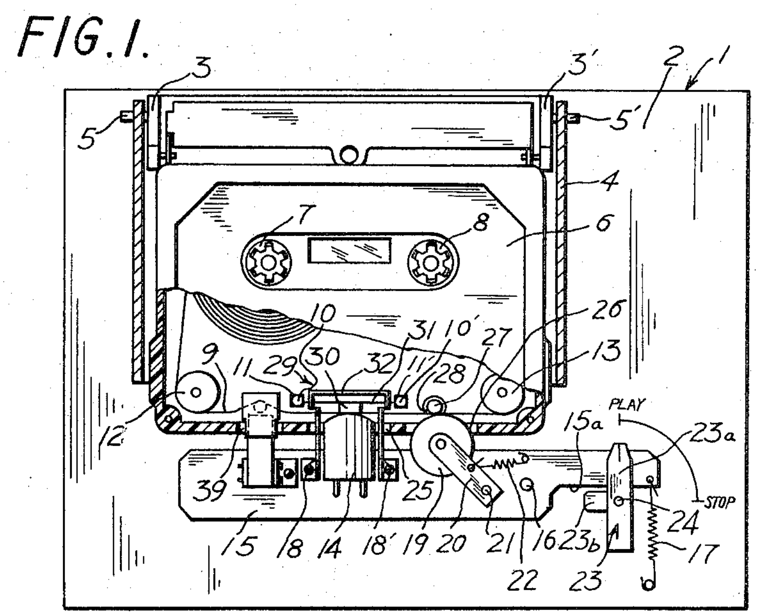
FIG. 1 is a plan view of a magnetic recording and reproducing apparatus in accordance with the present invention, with a portion of a cassette holder broken away for illustration of the features of the invention.

Referring now to FIG. 1, a magnetic recording and reproducing apparatus is generally indicated at numeral 1 and the apparatus comprises a chassis 2 which is disposed within and secured to a cabinet not shown in a suitable manner. The chassis has a pair of vertical brackets 3 and 3' secured thereto and a cassette receiving case or holder 4 is pivotally mounted on the brackets 3 and 3' at respective pivot pins 5 and 5'. The cassette holder 4, which has a vertical cross section of substantial rectangular shape, is adapted to receive a cassette 6 including a supplying reel 7 and a winding up reel 8 between which a magnetic tape 9 is wound. When the cassette holder 4 is upwardly pivoted about the axes of the pivot pins 5 and 5' by depressing a button (not shown) associated with the cassette holder through a suitable linkage, the cassette holder is raised up at its front face so that the cassette 6 can be inserted into the cassette holder 4 and withdrawn from the same. When the cassette holder 6 is downwardly pivoted about the axes of the pivot pins 5 and 5' by manually depressing the holder, it is lowered at its front face so that the cassette is positioned to assume the operative position. The chassis 2 is provided with a pair of locating pins 10 and 10' secured thereto whereas the cassette 6 is provided with locating holes 11 and 11' corresponding to the locating pins of the chassis. Thus, when the cassette together with the holder 4 is moved from the raised or inoperative position to the lowered or operative position, the cassette is located at a proper position relative to the chassis. A lock means (not shown) is provided for locking the cassette holder 4 in the operative position of the cassette and it is adapted to be disengaged from the cassette holder by depressing the button for upward pivotal movement of the holder.

The cassette 6 also includes two idler rollers 12 and 13 adjacent the front face of the cassette, one in one side of the holder and the other in the other side thereof and the tape is rewound from the supplying reel 7, passes around the idler rollers 12 and 13 and is wound around the winding up reel 8.

A magnetic head 14 is securedly mounted on a head supporting lever 15 which in turn is pivotally mounted on the chassis 2 about a pivot pin 16. The head supporting lever 15 is urged by a spring 17 to be pivoted about the axis of the pin 16 in a clockwise direction as viewed in FIG. 1 with one end of the spring 17 secured to the lever 15 and the other end of the spring secured to the chassis 2 in a suitable manner. The head supporting lever 15 has a pair of tape guides 18 and 18' secured thereto and spaced from and adjacent both side faces of the head 14 and a pinch roller 19 rotatably mounted on a channel shaped bracket 20 which in turn is pivotally mounted on the head supporting lever 15 about a pin 21 and which is urged by a spring 22 to be pivoted in a clockwise direction as viewed in FIG. 1 about the axis of the pin 21 with one end of the spring 22 secured to the bracket 20 and the other end of the spring 22 secured to the head supporting lever 15 in a suitable manner.

Figure 2:
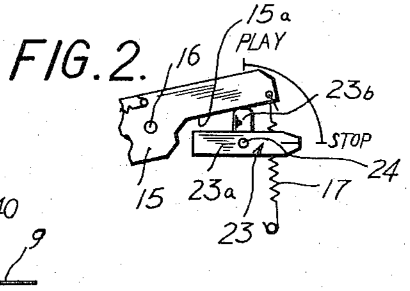
FIG. 2 is a view showing an operating knob for operating a head supporting lever, maintained in a retracted position of a magnetic head.

The head supporting lever may be provided with a cut away portion 15*a* adjacent which is disposed on the chassis 2 an operating knob 23 pivoted about a pin 24. The operating knob comprises a knob body 23*a* which extends through the cabinet and projects therefrom for manually gripping the body and an abutment 23*b* which is arranged to engage the adjacent surface of the cut away portion 15*a* of the head supporting lever 15 and disengage the same. When the operating knob 23 is oriented to PLAY position as shown in FIG. 1, the abutment 23*b* of the knob is spaced away from the cut away portion of the lever 15 so that the lever is urged by the spring 17 to be pivoted in a clockwise direction and when the operating knob 23 is oriented to STOP position, the abutment 23*b* of the knob forces the head supporting lever 15 to be pivoted in a counterclockwise direction against the action of the spring 17 as shown in FIG. 2.

The cassette is provided at its front face with an opening 25 through which the magnetic head extends and an opening 26 through which the pinch roller 19 extends. Thus, when the PLAY position of the operating knob 23 is selected, the magnetic head 14 and the pinch roller 19 then extend through the respective openings 25 and 26 and contact the tape 9 in the cassette, which, it is understood, passes adjacent and across the openings of the cassette.

On the chassis is rotatably mounted a capstan 27 which extends through an opening 28 provided in the bottom wall of the cassette 6 when it is in the operative position and the tape 9 in the cassette 6 is forced against the capstan 27 by the pinch roller 19 which extends through the opening 26 of the cassette 6.

The cassette includes a tape pressing device 29 which comprises a sponge pad 30 adapted to press the tape 9 against the predetermined track of the magnet head 14 and a leaf spring 31 to which the pad 30 is bonded, with both ends of the leaf spring 31 secured to a support 32 which in turn is affixed to the bottom wall of the cassette 6.

Figures 3, 4:
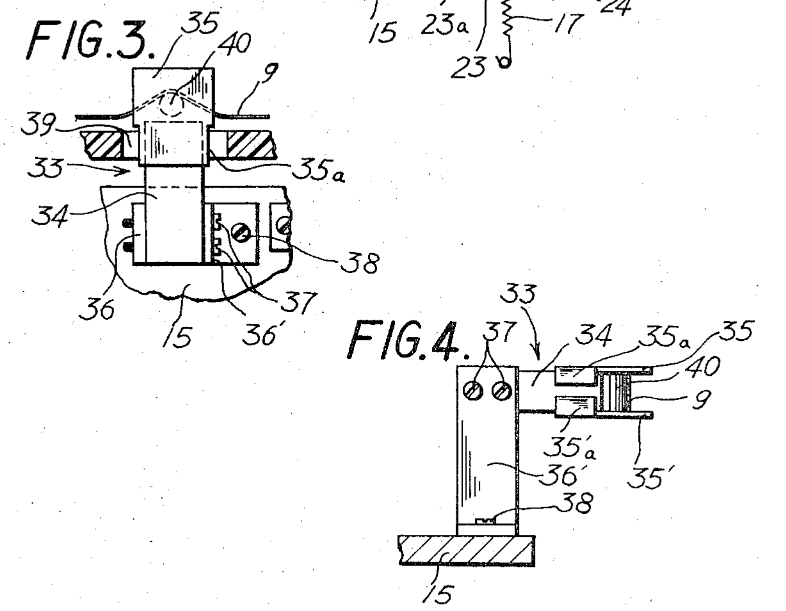
FIG. 3 is an enlarged plan view of a tension device embodying the present invention shown in an advanced position together with the associated head supporting lever illustrated in a fragmentary manner.
FIG. 4 is an enlarged side elevational view of the tension device shown in FIG. 3.
Figure 7:
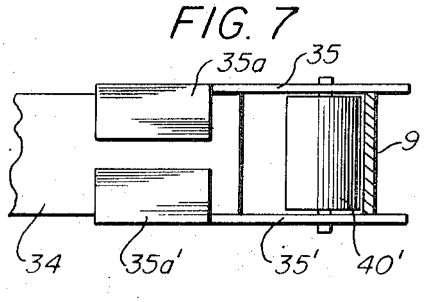
FIG. 7 is a fragmentary elevational view on enlarged scale of an alternate form of tension device in which the tape engaging component is a roller rather than a pin.

In order to apply tension on the magnetic tape 9 in the cassette 6 when it is in the operative position, there is provided a tension device 33 as shown in FIGS. 2 and 3 which comprises a tension arm 34 formed of elastomeric material, synthetic resin or foamed material thereof and having a longitudinal flexibility, one end of which is provided with an upper guide plate 35 and a lower guide plate 35' secured thereto by bracing the bent portions 35*a* and 35'*a* of the plates along and against the end of the tension arm 34. The other end of the resilient tension arm 34 is provided on its one side with a vertical arm of a L-shaped supporting member 36 and on its other side with a supporting member 36' and suitable fasteners 37 are adapted to fasten the upper ends of the supporting members 36 and 36' to the said other end of the resilient tension arm 34. In the illustrated embodiment, the fasteners 37 are in the form of bolts which extend through both supporting memers and the resilient tension arm and are threaded into the threaded hole of one of the supporting members 36 and 36'. The horizontal arm of the L-shaped supporting member 36 is mounted on the head supporting lever 15 and secured thereto by a screw 38 which extends through the horizontal arm of the member 36 and is threaded into the threaded hole of the lever 15. It will be understood that the front face of the cassette is provided with an opening 39 through which the tension device 33 extends when the head supporting lever 15 is in the advanced position in which the magnetic head 14 and the pinch roller 19 also extend through the openings 25 and 26 of the cassette and contact the tape therein. The tension device 33 also comprises a pin 40 vertically disposed between the upper and lower guide plates 35 and 35' and secured thereto for engaging the tape and applying tension on the same by pressing the tape rearwardly of the cassette when the cassette is in the operative position and the tension device 33 extends through the opening 39 of the cassette. The pin 40 is preferably of a cross section of circle as shown in FIG. 1 and may be formed of metal, synthetic resin and other materials having a lower coefficient of friction so that the tape is prevented from being damaged. Alternatively, the pin 40 may be substituted by a roller 40' (FIG.7) or the like.

In operation, when the cassette is in the operative position and the PLAY position of the operating knob 23 is selected, the magnetic head 14, the pinch roller 19 and the tension device 33 extend through the respective openings 25, 26 and 39 of the cassette and engage the tape therein for preparation of the recording or reproducing operation. In such condition of the apparatus, the magnetic tape in the cassette is tensioned by the tension device 33 as shown in FIG. 3. When the tape begins to be fed by actuating the capstan 27, a change in tension occurs in the tape, but since the tension device can be resiliently responsive to the change in tension of the tape, it is absorbed by the resilient or flexible tension arm 34 in the tension device 33 so that the change in tension is prevented from being transmitted to the supplying reel in the cassette. Thus, the quick actuation of the tape in the cassette is effected without any bounce and looseness of the tape and without any breakage of the tape and the characteristic on the actuation of the apparatus is improved. It will be understood that since the tape passes in contact with the pin 40 carried on the resilient tension arm 34 of the tension device 33, flutter which occurs in the feeding tape is eliminated resulting from the absorption of flutter by the resilient tension arm. Also, it will be understood that since the tape passes between the guide plates 35 and 35', the tape tending to be offset upwardly or downwardly from the pin 40 of the tension device 33 is guided by the guide plates at proper level to cause the tape to pass in contact with the magnetic head in a given track position of the head.

Figure 5:
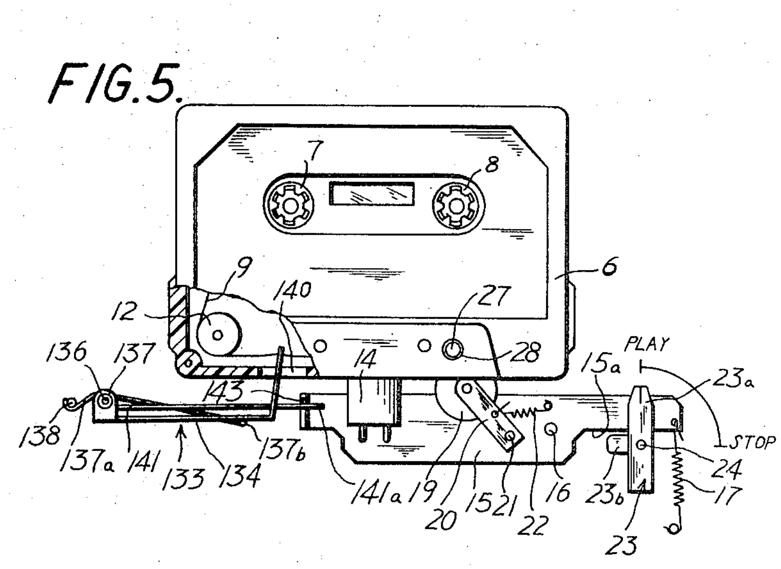
FIG. 5 is a plan view of an alternative embodiment of the present invention with a cassette holder eliminated and with a cassette partially broken away for illustration of the features of the invention.
Figure 6:
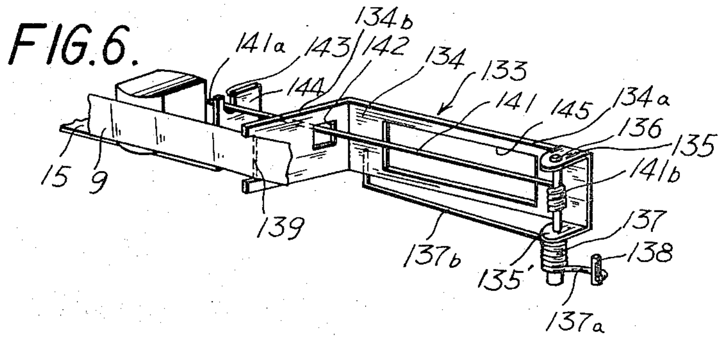
FIG. 6 is a perspective view of a tension device for use in the apparatus shown in FIG. 5.

In FIGS. 5 and 6, there is an alternative embodiment of the present invention wherein the tension device 133 is separated from the head supporting lever 15, but it is associated with the lever. The tension device comprises a L-shaped rigid tension arm 134 in the form of a thin strip of metal, synthetic resin or any other material, the longer arm portion **134*a* of which is so arranged that it is spaced from the free end of the head supporting lever, but it is substantially parallel to the lever so as to have a common longitudinal axis and the far end 134*b* of the arm portion from the lever 15 has an upper lug 135 and a lower lug 135' into both of which is loosely fitted a fixed shaft 136 secured to the chassis. Around the lower portion of the shaft 136 is wound a coil spring 137 one end 137*a* of which is secured to a pin 138 on the chassis and the other end 137*b* of which extends toward the head supporting lever in an angular manner relative to the longer arm portion 134*a* and engages the front surfaces of the arm portion 134*a* at the bent portion of the extended end 137*b* so that the strip arm 134 is urged to be pivotally moved about the fixed shaft 136 in a counterclockwise direction as viewed in FIG. 5. The shorter arm portion 134*b* of the tension arm is provided at its front edge with a notch 139 which is adapted to engage and guide the tape in the cassette 6 for prevention of the tape from deviation out of the predetermined path level when the cassette is in the operative position and the shorter arm portion of the tension arm 134 extends through an opening 140 of the cassette which is similar to the opening 39 of the cassette in the aforementioned embodiment in connection with FIGS. 1 to 4**.

In order to associate the tension device 133 with the head supporting lever 15, there is provided a connecting bar 141 extending through a perforation 142 in the shorter arm portion **134*b* of the L-shaped arm 134, one end 141*a* of which bar is engaged with a slot 143 in the upward bent portion 144 of the head supporting lever 15 and the other end 141*b* of the connecting bar 141 is wound around the fixed shaft 136. In order to reduce the mass of the L-shaped arm 134, the arm is preferably provided with a blanked portion or an opening 145 in the longer arm portion 134*a***.

When the cassette is in the operative position and the PLAY position of the operating knob 23 is selected, the tension device 133 is urged by the spring 17 through the head supporting lever 15 and the connecting bar 141 to advance toward the cassette and the shorter arm portion **134*b* of the tension arm 134 extends through the opening 140 of the cassette and engages and forces the tape in the cassette rearwardly of the cassette so that the tape is tensioned under a suitable pressure. When the tape begins to be fed, the change in tension which occurs in the tape is absorbed by the tension arm 134 retracted against the spring 137 in a response to the change in tension on the tape. It should be noted that when the tension device 133 is in the operative condition in contact with the tape, the connecting bar 141 is disengaged with the wall which defines the perforation 142 resulting in that the spring 137 effectively acts on the tape 9 through the tension arm 134 without any interference from the head supporting lever 15. It will be understood that the tape passes and is guided by the notch 139 of the shorter arm portion 134*b* of the tension arm 134** to prevent the tape from upward and downward deviation out of the predetermined path level to effect the engagement of the tape with the magnetic head in a given head track position.

While specific embodiments of the invention have been shown and described in detail it will be understood that the same are for illustration purpose only and are not to be taken as a definition of the invention and that various modifications and changes on the same will easily occur to those skilled in the art without any departure from the scope of the invention as defined in the appended claims.

What is claimed is:

1. A magnetic recording and reproducing apparatus for use with a cassette including a pair of reels between which a magnetic tape is wound, comprising a magnetic head movable between an advanced position in which the magnetic head contacts the tape in the cassette and a retracted position in which the magnetic head is apart from the cassette, a capstan for feeding the magnetic tape in the cassette and a pinch roller arranged to associate with the magnetic head for forcing the tape against the capstan, said cassette having a non-operative position in which the cassette can be received into the apparatus and withdrawn therefrom and an operative position in which the cassette cooperates with the magnetic head and the pinch roller in the advanced position and the capstan to record on or reproduce from the tape in the cassette, said apparatus including a tension device arranged to resiliently apply tension on the magnetic tape in the cassette when the cassette is in the operative position, comprising a tension arm having an engaging portion for engaging the tape in an anti-frictional manner, said tension device associated with said magnetic head and said pinch roller so that when said magnetic head and said pinch roller engage the tape, said engaging portion of said tension arm is forced against the tape and when said magnetic head and said pinch roller are disengaged with the tape, said engaging portion of said tension arm is apart from the tape.

2. A magnetic recording and reproducing apparatus as set forth in claim 1 wherein said magnetic head is mounted on a head supporting lever pivoted about its pivot axis and wherein said tension arm is formed of a resilient material with one end of said tension arm secured to said head supporting lever so that said tension arm together with said magnetic head moves between the advanced position and the retracted position, and with the other end of said tension arm having said engaging portion provided thereon.

3. A magnetic recording and reproducing apparatus as set forth in claim 2 wherein said engaging portion on said tension arm is formed of anti-frictional material.

4. A magnetic recording and reproducing apparatus as set forth in claim 2 wherein said engaging portion of said tension arm comprises a roller pivotally mounted on said arm.

5. A magnetic recording and reproducing apparatus as set forth in claim 2 wherein said resilient arm is provided with a pair of guide plates arranged so that the tape passes between them and said engaging portion on said tension arm is mounted on said guide plates.

6. A magnetic recording and reproducing apparatus as set forth in claim 1 wherein said magnetic head is mounted on a head supporting lever pivoted about its pivot axis and wherein said tension arm is formed of a rigid material pivoted about its pivot axis, said tension further including spring means for urging said tension arm toward the advanced position in which the engaging portion on said tension arm is forced against the tape in the cassette and connecting means for associating the said tension arm with said head supporting lever.

7. A magnetic recording and reproducing apparatus as set forth in claim 6 wherein said connecting means is so arranged that said connecting means is free of said tension arm when said tension arm is in the advanced position in which said engaging portion of said tension arm is forced against the magnetic tape.

8. A magnetic recording and reproducing apparatus as set forth in claim 6 wherein said engaging portion of said tension arm is provided with guide means for guiding the tape so that the tape contacts the predetermined track of said magnetic head.

9. A magnetic recording and reproducing apparatus as set forth in claim 6 wherein said engaging portion of said tension arm is formed of anti-frictional material.

* * * * *